US006484218B1

(12) United States Patent
Pipho

(10) Patent No.: US 6,484,218 B1
(45) Date of Patent: Nov. 19, 2002

(54) METHOD FOR IMPROVING DIRECT MEMORY ACCESS PERFORMANCE

(75) Inventor: Randall E. Pipho, Leander, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/411,444

(22) Filed: Oct. 1, 1999

Related U.S. Application Data
(60) Provisional application No. 60/103,544, filed on Oct. 8, 1998.

(51) Int. Cl.$^7$ .................... G06F 13/12; G06F 12/08
(52) U.S. Cl. .................... 710/32; 711/100; 711/163; 710/22; 710/100; 710/17; 370/498
(58) Field of Search .................... 710/126, 1–3, 710/22, 129, 305, 308, 309, 310, 316, 8, 12, 5, 32, 100, 17; 711/173, 100, 163, 171; 709/100; 713/313, 20; 370/498

(56) References Cited

U.S. PATENT DOCUMENTS

| 5,953,511 | A  | * | 9/1999 | Sescila, III et al. | ......... | 710/129 |
| 6,185,632 | B1 | * | 2/2001 | Berkema | ..................... | 710/20 |
| 6,247,083 | B1 | * | 6/2001 | Hake et al. | ................. | 710/107 |
| 6,347,097 | B1 | * | 2/2002 | Deng | ........................ | 711/173 |

FOREIGN PATENT DOCUMENTS

| EP | 1 017 235 A2 | * | 5/1999 |
| EP | 1 094 637 A2 | * | 10/2000 |

OTHER PUBLICATIONS

"Handling of an IEEE 1394 High Performance Serial Bus Reset", IBM Technical Disclosure Bulletin, pp. 145–146, Dec. 1994.*
IEEE Standard for a High Performance Serial Bus, Published Aug. 30, 1996, IEEE Standard 1394–1995, pp. 1–372.*
Shea, T.J et al., "Evaluation of IEEE 1394 Serial Bus for Distributed Data Acquisition", Proceedings of the 1997 Particle Accelerator Conference, pp. 2502–2504, May 1997.*
Preliminary CXD1947Q, IEEE1394 Link Layer/PCI Bridge LSI, www.sel.sony.com/semi/pdf/cx01947q.pdf, Dec. 1996, pp. 1–4.*
(PCILynx) IEEE1394–1995 Bus to PCI Interface, www.ti.com, pp. 1–18, Apr. 1997.*

* cited by examiner

Primary Examiner—Matthew Kim
Assistant Examiner—Pierre-Michel Bataille
(74) Attorney, Agent, or Firm—J. Dennis Moore; W. James Brady III; Frederick J. Telecky, Jr.

(57) ABSTRACT

A serial bus controller having improved bus performance when a physical read request or a physical write request is present. A link and physical layer logic unit is provided, coupled to a serial bus having at least one peripheral device coupled thereto. A host interface is provided, coupled to a host data bus. A request FIFO is provided, coupled to receive a host memory read or write request packet from the link and physical layer logic unit, and coupled to said host interface. A physical read request FIFO is provided, coupled to receive a physical read request from the request FIFO for further processing of the physical read request. A physical write request FIFO is provided, coupled to receive a physical write response for transfer to the peripheral device.

1 Claim, 5 Drawing Sheets

METHOD FOR IMPROVING DIRECT MEMORY ACCESS PERFORMANCE

This application claims priority under 35 U.S.C. 119(e)(1) of provisional application No. 60/103,544, filed Oct. 8, 1998.

TECHNICAL FIELD OF THE INVENTION

The invention relates to methods for reducing bus latency in a computer system and, in particular, to such methods in computers including a data bus controller.

BACKGROUND OF THE INVENTION

The typical computer system communicates almost continuously with peripheral devices attached to the system. This creates a requirement for high performance, bidirectional data transmission to accomplish mass information transfer. One way this requirement is met is through the use of a high speed serial data bus to which the peripheral devices are interfaced through one or more bus controller devices.

A primary aspect of the information transfer when communicating with a peripheral device is reading from and writing to the memory of the computer system by accessing the system's peripheral device access bus, for example by accessing a peripheral component interconnect (PCI) data bus. This is accomplished by performing direct memory access (DMA) through use of a DMA controller which oversees the system memory read and write functions for peripheral data independent of the central processor unit (CPU). Use of a DMA controller provides a more efficient way in which to perform memory read and write tasks related to peripherals than by using the CPU to do so. This is due to the capability of the DMA controller to transfer large blocks of data at one time, whereas the CPU is limited to a register-by-register procedure.

The DMA controller communicates with the CPU to acquire control of the system memory bus for a memory read or write task, and then signals the CPU when the task is complete. The DMA controller returns control of the system memory bus to the CPU only when it determines that the data transfer is completed. The CPU is idle during the time required for the data transfer since two devices cannot access the memory bus simultaneously, and the serial data bus is unavailable for use by any other attached peripheral device while a data transfer is taking place. The availability of the system memory bus and serial data bus determine the computer system's bus latency or dormancy, which directly influences the overall system performance as related to CPU idle time.

Typically, a data bus controller contains memory devices for temporarily storing the data to be transferred, and no data is stored in the DMA controller. The number and size of these memory devices and their utilization scheme largely determine the efficiency with which the bus controller is able to effect a data transfer.

FIG. 1 shows an IEEE Standard 1394 high speed serial data bus controller, 1394 Bus Controller 1, and the data path to an IEEE Standard 1394 physical layer device, 1394 Physical Layer 6, to which Peripheral Devices 7 are connected. The 1394 Physical Layer 6 typically includes cable transceivers and arbitration logic for peripheral device interfacing.

1394 Bus Controller 1 is capable of transferring data packets between Peripheral Devices 7 and the computer system memory (not shown) by performing direct memory access. Data structures referred to as descriptors, sometimes referred to as packet control lists (PCL), completely describe the data to be transferred including sources and destinations, how many bytes of data are to be transferred, and error control information.

In the discussion that follows the transfer of data will be described in the context of data being transferred from one of the peripheral devices in Peripheral Devices 7 to computer system memory (not shown). The transfer of data from system memory to a peripheral device is similar in most respects, and in order to avoid duplicative description will therefore not be described in detail.

When the peripheral device is required to transfer data it submits a system memory read or write request to a 1394 Link Layer Control Logic unit (LLC) 5 through a 1394 Physical Layer 6. The LLC 5 directs the request to DMA Logic 3. DMA Logic 3 then acquires control of the system memory bus, placing the CPU (not shown) in an idle state. The data to be transferred is acquired by LLC 5 through 1394 Physical Layer 6 and written to first-in-first-out (FIFO) memory in FIFO Logic 4. When DMA Logic 3 determines that all criteria for the transfer have been met in accordance with the descriptors, DMA Logic 3 causes the data to be transferred from the FIFO memory to the PCI Bus through PCI Logic in a PCI and Local Bus Interface unit 2, and to be written to system memory. Upon completion of the memory write cycle LLC 5 signals the peripheral device that the transfer is complete, at which time the device must return an acknowledgment to LLC 5 in order to close out the transfer. The CPU is then signaled by DMA Logic 3 that the transfer is complete, at which time the CPU acquires control of the system memory bus and resumes processing.

If for any reason the peripheral device does not issue the required acknowledgment, as might be the case if the device were busy, LLC 5 can not close out the transfer and release the system memory bus. The device may also request a retry of the data transfer, which is sometimes done to provide more current data, which too prevents release of the memory bus back to the CPU.

Computer systems typically include provisions for limiting the time the bus controller must wait for device acknowledgment and the maximum number of transfer retries permitted for purposes of overall system performance. These limits are usually not so stringent, however, as to prevent unacceptable bus latency.

SUMMARY OF THE INVENTION

In accordance with the present invention there is provided a serial bus controller having improved bus performance when a physical read request or a physical write request is present. A link and physical layer logic unit is provided, coupled to a serial bus having at least one peripheral device coupled thereto. A host interface is provided, coupled to a host data bus. A request FIFO is provided, coupled to receive a host memory read or write request packet from the link and physical layer logic unit, and coupled to said host interface. A physical read request FIFO is provided, coupled to receive a physical read request from the request FIFO for further processing of the physical read request. A physical write request FIFO is provided, coupled to receive a physical write response for transfer to the peripheral device.

These and other features of the invention will be apparent to those skilled in the art from the following detailed description of the invention, taken together with the accompanying drawings.

DETAILED DESCRIPTION OF THE PREFERRED EMBODIMENT

The preferred embodiment of the present invention will now be described, in the context of its use in a semiconductor device known as an Open Host Controller Interface (OHCI) which is defined in IEEE Standard 1394 and subsidiary specifications referenced therein. The OHCI performs the functions of a IEEE 1394 Link Layer device that provides the electronic interface between a host computer, typically a personal computer, and an IEEE Standard 1394 Physical Layer Interface device to which peripheral devices of the computer system are attached. The OHCI provides a 1394 interface for high performance audio, video and data, and a means of communicating with high speed peripherals with a universal software driver that resides in the host system.

The preferred embodiment includes of two FIFO memory devices, 64 bytes and 16 bytes in size, provided in a data bus controller. These FIFO devices supplement two other FIFO devices of 2000 bytes each in the bus controller, and provide a storage location for data transfer requests of a particular type between host system memory and peripheral devices.

The use of the two smaller FIFO devices provide a means for the bus controller to improve the efficiency of direct memory access by the controller and to perform concurrent processing of multiple transfer requests. This is accomplished by transferring into the smaller FIFO devices data packets that would otherwise be stored in the larger FIFO devices for serial-type processing by the controller.

The preferred embodiment of the present invention is described herein in the context of its use as an IEEE 1394 serial data bus controller in a personal computer (PC), and in particular as a means to perform data transfers between the host system and its peripheral devices.

The data transfers described herein are known specifically as "Physical Read and Write Requests" in accordance with IEEE Standard 1394, and are but one type of an asynchronous transfer the bus controller is capable of performing. Physical requests are initiated by the host CPU and executed by the bus controller by performing DMA without software intervention. Discussion below shows that the bus controller to be described also performs isosynchronous transfers and other types of asynchronous transfers between the host computer and peripheral devices, in addition to the physical read and write requests.

Figure 1:
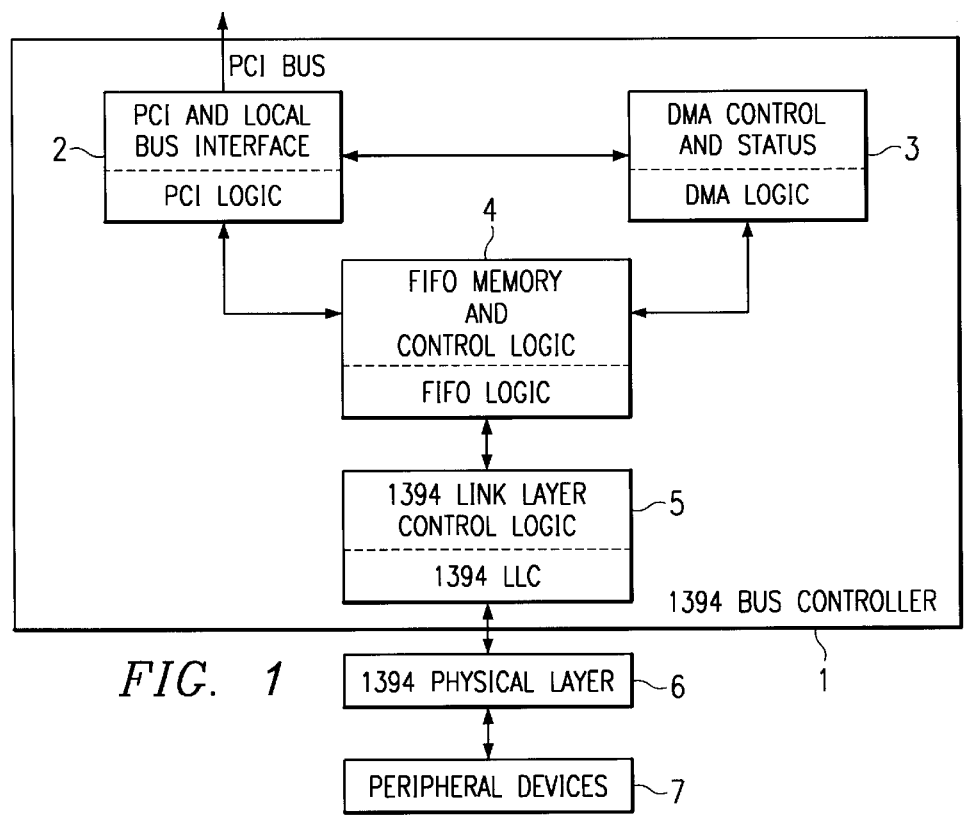
FIG. 1 is a functional block diagram of an IEEE 1394 bus controller.
Figure 2:
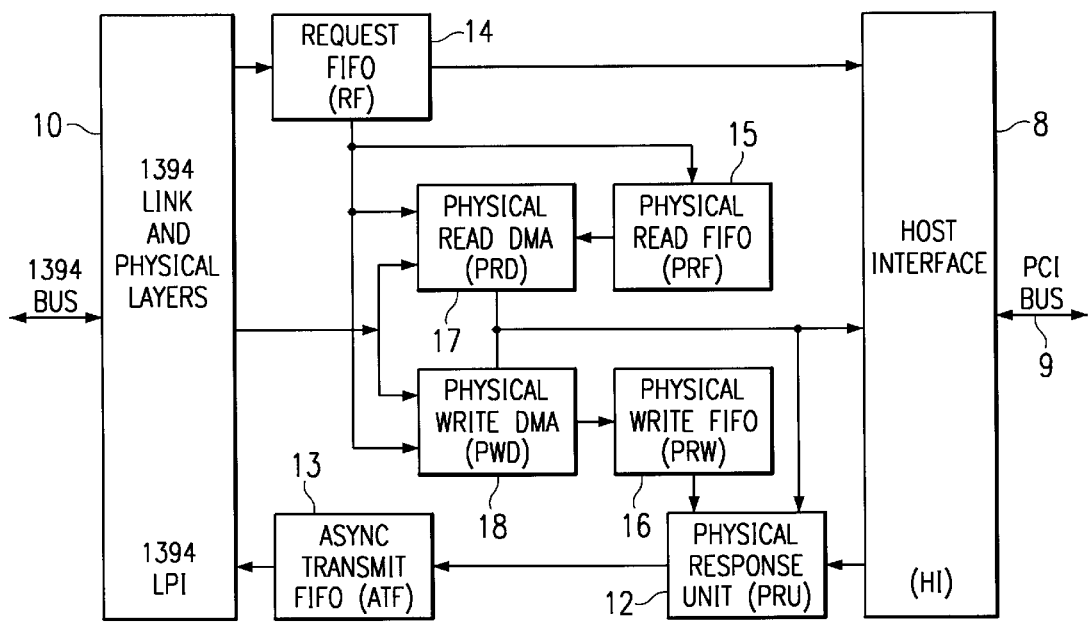
FIG. 2 is a partial functional block diagram of an IEEE 1394 OHCI bus controller.

FIG. 2 is a partial functional block diagram of an IEEE 1394 serial bus controller that depicts only functional relationships and does not include actual signal paths.

FIG. 2 shows that the controller includes a host interface (HI) 8 which itself includes the means to perform direct memory access of the host system memory bus via a PCI Bus 9. It also shows a 1394 Link and Physical Layers interface unit (LPI) 10 which provides the electronic and logic interface to peripheral devices via the 1394 Bus. The remaining elements of FIG. 2 are described in the discussion that follows.

Requests from a host CPU (not shown) for directly reading from or writing to system memory by a peripheral device (not shown), or physical requests, are received by HI 8 and routed to a Physical Response Unit (PRU) 12 which writes the request information to an Asynchronous Transmit FIFO unit (ATF) 13. The request information is communicated to the device by LPI 10 via the 1394 Bus. The peripheral device then submits a host memory read or write request packet through LPI 10 which is stored in a Request FIFO unit (RF) 14. A write request packet includes the peripheral data to be transferred and host system memory information; a read request includes just the host system memory information.

In the case of a physical write request the peripheral data is transferred directly to HI 8 from RF 14 by a Physical Write DMA unit (PWD) 18. PWD 18 also issues a DMA request through HI 8 causing the system CPU to relinquish control of the system memory bus, upon which the peripheral data is written to PCI BUS 9 from HI 8. Upon completion of the data transfer PWD 18 returns control of the system memory bus to the CPU by closing the DMA request, then writes a response packet to a Physical Write FIFO unit (PWF) 16 for transfer to the peripheral device by PRU 12 and ATF 13. PWD 18 then awaits acknowledgment from the device via LPI 10.

Depending upon the type of acknowledgment received, PWD 18 terminates the transaction if indicated acceptable by the peripheral device, or re-sends the response packet if the device indicates it is busy.

It is important to note here that once the response packet is written to PWF 16 and during the time PWD 18 is waiting for device acknowledgment, other transactions can be processed by the bus controller and control of the system memory bus also has been returned to the CPU. This is possible due to the use of PWF 16 to hold the response packet while device acknowledgment is pending, and PWD 18 having terminated the DMA request.

For the case of a physical read request the request packet is transferred directly to a Physical Read FIFO unit (PRF) 15 from RF 14 by a Physical Read DMA unit (PRD) 17. PRD 17 then issues a DMA request through HI 8 causing the system CPU to relinquish control of the system memory bus. The requested data and response information is then written to HI 8 from PCI Bus 9 and into ATF 13 by PRD 17 for transmittal to the peripheral device via LPI 10. The original request packet is held in PRF 15. PRD 17 then returns control of the system memory bus to the CPU and awaits acknowledgment from the device through LPI 10.

Depending upon the type of acknowledgment received PRD 17 either terminates the transaction or re-sends the data and response information to the device. As is the case for the memory write request described previously, other transactions can be processed by the bus controller and CPU during the time PRD 17 is awaiting device acknowledgment.

Concurrent processing by the bus controller is made possible by removing the physical request packets from RF 14 as described above, and utilizing FIFO memories PRF 15 and PWF 16 to store the applicable request and response packets. This allows RF 14 to continue receiving request packets for processing, including additional physical requests, isosynchronous requests, and other asynchronous requests, before preceding physical requests have been closed out. Bus controllers of the prior art typically require that a transfer request be completed and acknowledged before a new request can be processed.

Figure 3:
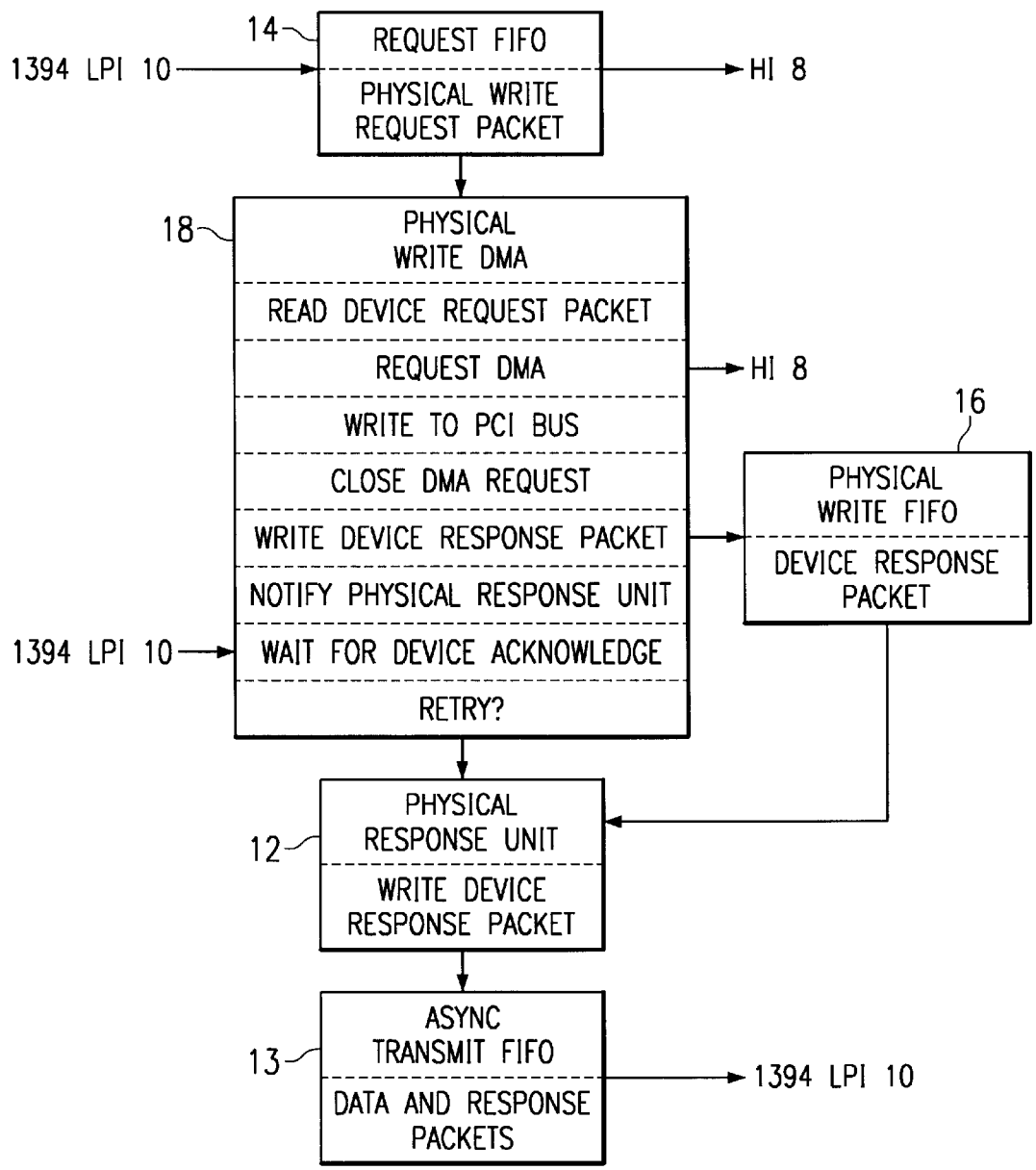
FIG. 3 is a data transfer flowchart for a physical write request.
Figure 4:
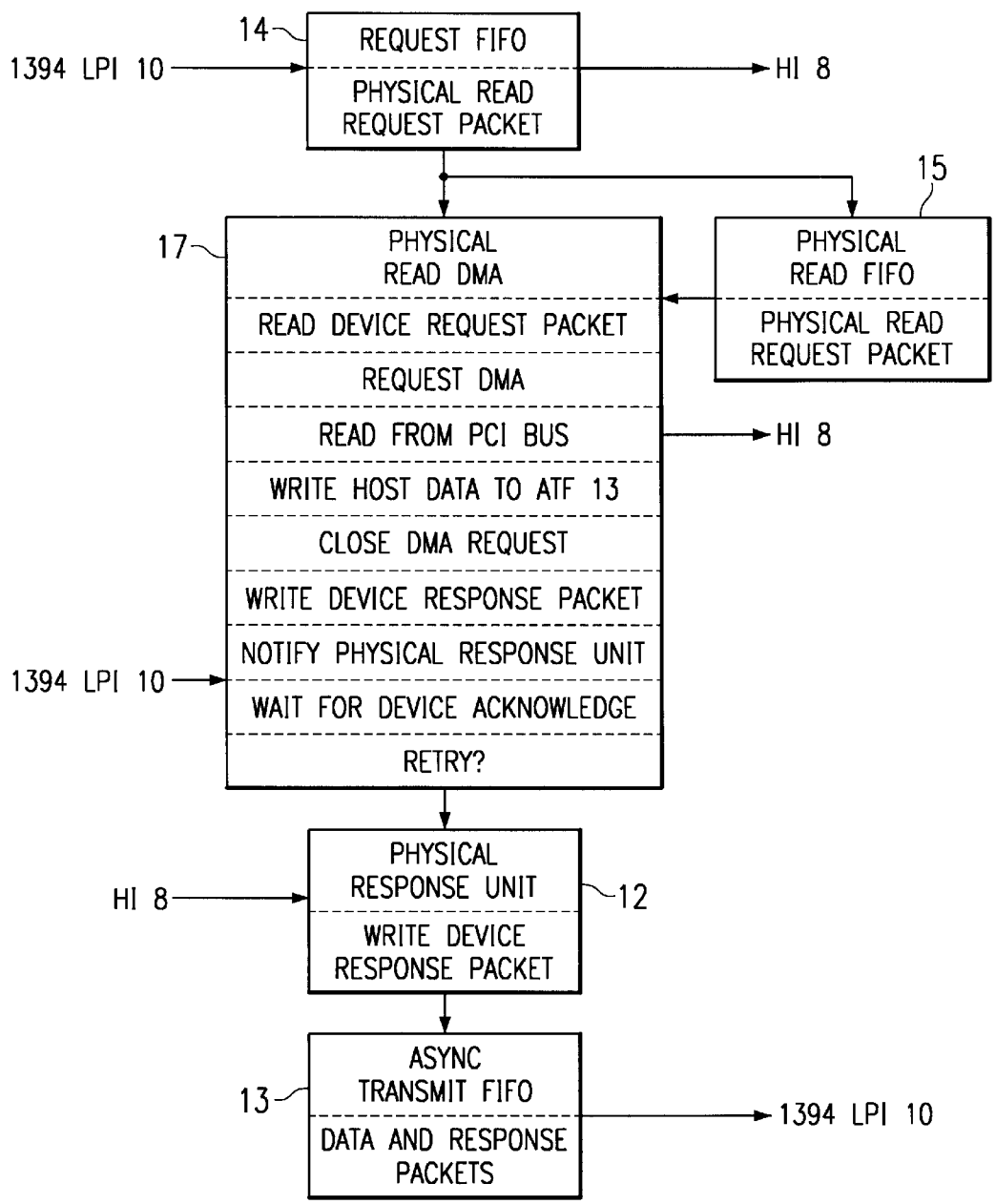
FIG. 4 is a data transfer flowchart for a physical read request.

FIGS. 3 and 4 illustrate the data flow and DMA activity for physical write and read requests, respectively, received by the bus controller from peripheral devices. These figures are included to supplement the discussion of the block diagram of FIG. 2 which is directly applicable to FIGS. 3 and 4.

FIG. 3 illustrates the data flow and DMA activity for a physical write request. The FIFO element blocks in FIG. 3, RF 14, PWF 16, and ATF 13, include the information written to them for the write request. DMA element block PWD 18 includes the actions taken by that element in processing the write request, as does element block PRU 12.

Referring to FIG. 3, a physical write request from a peripheral device, which includes peripheral data, is written to RF 14 through LPI 10. The request packet is interpreted by PWD 18 which then issues a DMA request through HI 8. When PWD 18 acquires control of the memory bus it causes the data to be written from RF 14 to the PCI Bus through HI 8 and closes out the DMA request. PWD 18 then writes a response packet to PWF 16 for transmittal to the device via ATF 13 and awaits acknowledgment or a retry indication.

FIG. 4 illustrates the data flow and DMA activity for a physical read request. The FIFO element blocks in FIG. 4, RF 14, PRF 15, and ATF 13, include the information written to them for a physical read request. DMA element block PRD 17 includes the actions taken by that element in processing a read request, as does element block PRU 12.

Referring to FIG. 4, a physical read request from a peripheral device is written to RF 14 through LPI 10 then transferred to PRF 15 by PRD 17. PRD 17 interprets the request packet then issues a DMA request to the host CPU through HI 8. When the host CPU relinquishes the memory bus PRD 17 causes the requested data to be read from the PCI bus through HI 8 into ATF 13 and closes out the DMA request. PRD 17 also writes response information into ATF 13 along with the requested data. PRD 17 then awaits device acknowledgment or a retry indication.

As can be seen from the above discussion, the DMA requests which idle the host CPU are closed by PRD 17 and PWD 18 prior to device acknowledgment, allowing the CPU to resume processing. The bus controller is also able to perform concurrent processing of other requests, such as isosynchronous or other asynchronous data transfers, while PRD 17 and PWD 18 await device acknowledgment since the physical requests have been removed from RF 14. This is made possible through the use of FIFO elements PRF 15 and PWF 16 to store the request and response packets.

It can also be seen from the above discussion that the bus controller is able, for example, to begin processing a physical read request while waiting for a peripheral device to acknowledge completion of a physical write request.

It is important to note that the use of FIFO devices PRF 15 and PWF 16 as described here is not limited to IEEE 1394 data bus applications, but rather may be included in other applications for reducing bus latency or to provide a concurrent processing capability.

Figure 5:
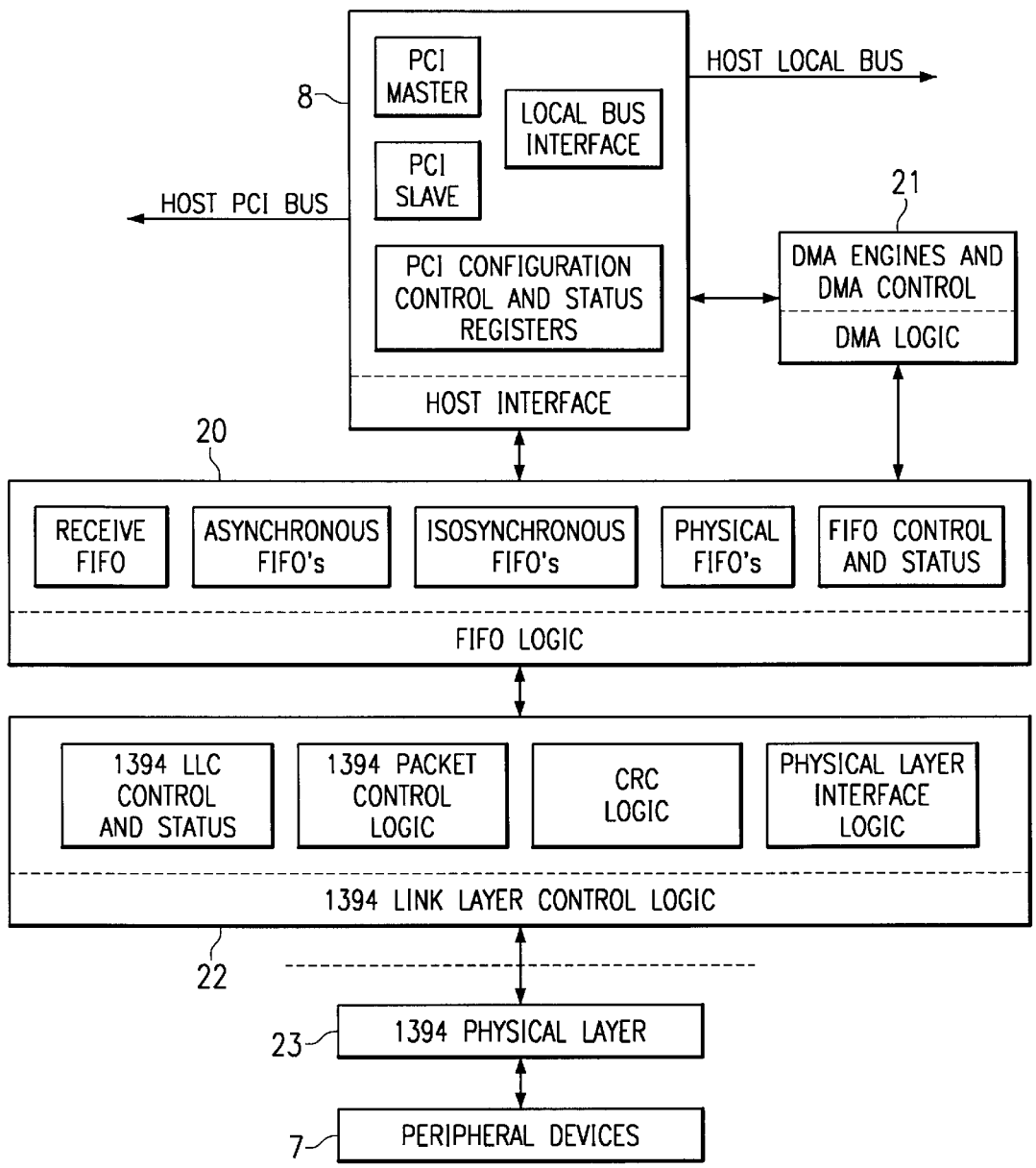
FIG. 5 is a functional block diagram of an IEEE 1394 OHCI bus controller.

FIG. 5 is a functional block diagram of an IEEE 1394 OHCI bus controller that includes the FIFO memory devices PRF 15 and PWF 16 described above. It is comprised of a Host Interface unit 8, a FIFO Logic unit 20, a DMA Logic unit 21, and 1394 Link Layer Control Logic unit 22. FIG. 5 also includes a 1394 Physical Layer unit 23 and Peripheral Devices 7.

FIFO memory devices PRF 15 and PWF 16 described above in connection with FIG. 2 are included in FIFO Logic unit 20 of FIG. 5 as Physical FIFOs. FIFO Logic unit 20 also includes RF 14 of FIG. 2, shown as Receive FIFO in FIG. 5 and ATF 13 of FIG. 2 as part of Asynchronous FIFOs in FIG. 5. Also included in FIFO Logic unit 20 is Isosynchronous FIFOs used only for isosynchronous data transfers. As mentioned in previous discussion the data bus controller of FIG. 5 processes other types of transfer requests in addition to physical read and write requests.

Devices PRU 12, PRD 17, PWD 18, and RD 19 of FIG. 2 are included in DMA Logic 21 of FIG. 5. The 1394 Bus interface block 1394 LPI 10 of FIG. 2 is comprised of 1394 Link Layer Control Logic 22 and 1394 Physical Layer 23 of FIG. 5.

The bus controller shown in FIG. 5 provides the serial data interface between a host computer and IEEE 1394 OHCI compliant peripheral devices, and has been implemented as a semiconductor device by Texas Instruments. This device performs all interfacing and data transfer functions of a high performance serial data bus as specified in IEEE Standard 1394.

The size of the FIFO memory devices PRF 15 and PWF 16 included in the bus controller of FIG. 5 are 64 bytes and 16 bytes, respectively. The physical read FIFO, PRF 15, is larger due to it being required to store the entire read request packet and is able to store four such packets. The physical write FIFO, PWF 16, is required to store only the data needed to construct the write response packet, but is large enough to store data for four such packets.

No attempt will be made to quantify the reduction in bus latency that can be realized through inclusion of the present invention in a data bus controller. The data transfer activity through a bus controller and associated bus latency is determined by the specific use of the computer system and the mix of peripheral devices attached to it.

Figure 6:
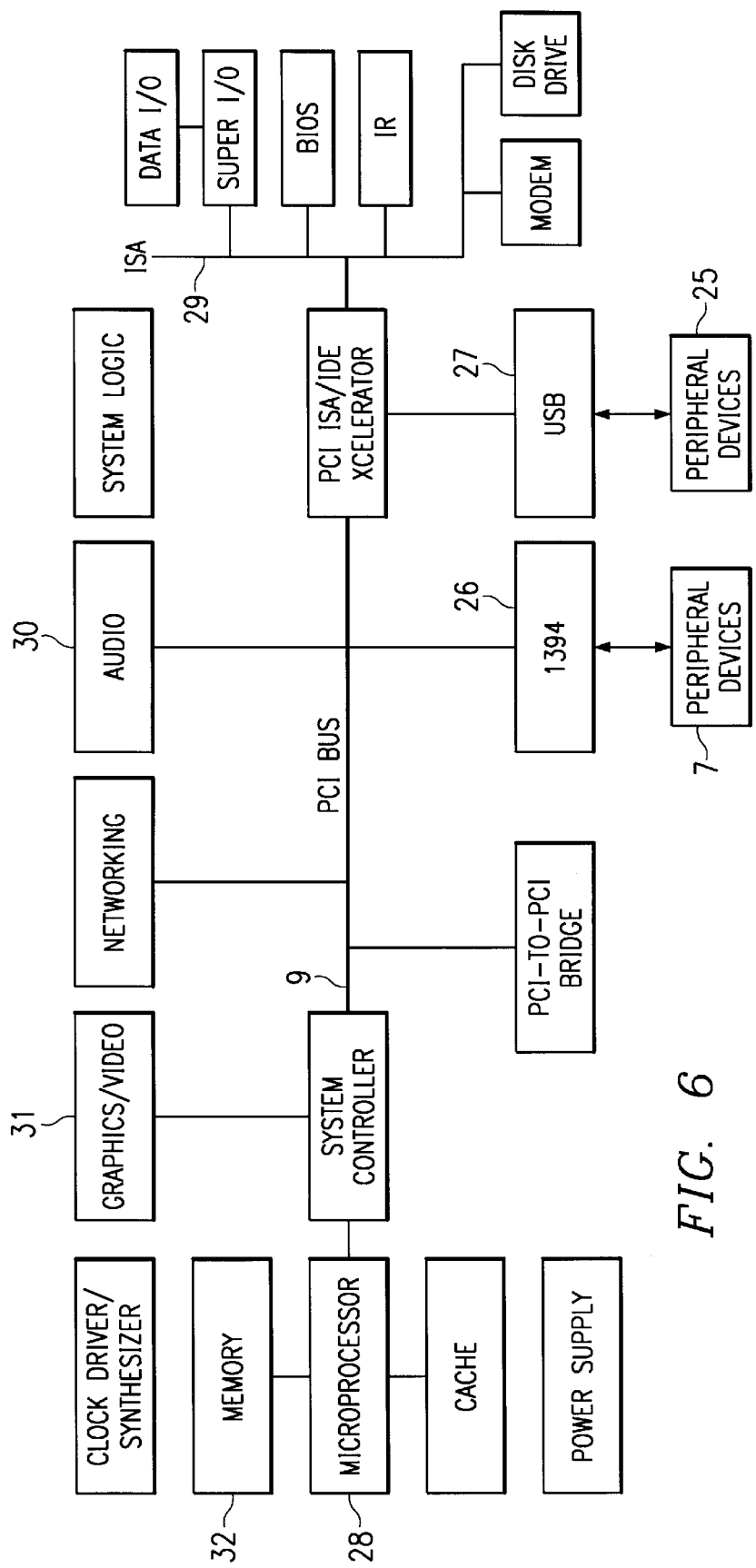
FIG. 6 is a system block diagram of a personal computer.

FIG. 6 is a system block diagram of a typical personal computer with the addition of Peripheral Devices 24 and Peripheral Devices 25 shown interfaced to the system through 1394 bus controller (1394) 26 and Universal Serial Bus controller (USB) 27. The OHCI bus controller of FIG. 5 described previously, which includes FIFO memory devices PRF 15 and PWF 16 of the present invention shown in FIG. 2, is included in 1394 26. The data transfer and bus latency aspects of a PC, as related to the preferred embodiment of the present invention, will now be discussed in conjunction with a description of FIG. 6. Only those elements of FIG. 6 pertinent to an understanding of the these topics will be discussed.

All devices attached to the computer system of FIG. 6 through 1394 26, USB 27, Industry Standard Architecture (ISA) bus 29, Audio Interface 30, and Graphics/Video Adapter 31 use direct memory access via PCI Bus 9 to read from or write to System Memory 32, which places CPU 28 in an idle state until the data transfer is complete. During a data transfer to or from system memory, as described previously, the bus controller or other interface device has control of the system memory bus associated with System Memory 32 until the transfer is complete and acknowledgment is received, preventing access by any other device, in addition to idling CPU 28. Bus controller 1394 26, however, is not required to wait for device acknowledgment due to the inclusion of the present invention.

The benefits derived from the use of high performance microprocessors can be substantially negated by data bus controllers that cause system bus latency. Inclusion of the physical read and write FIFOs of the present invention and their utilization in the way described herein will minimize the microprocessor idle time during data transfers for peripheral devices interfaced to the system through 1394 26 of FIG. 6.

This is accomplished by releasing the system memory bus back to the CPU before peripheral device acknowledgment is received, and the capability to perform concurrent processing of transfer requests.

Thus it has been shown that the preferred embodiment of the present invention includes the means to substantially reduce the idle time of a CPU incurred during data transfers between a host system and peripheral devices.

It has further been shown that the preferred embodiment of the present invention includes the means to improve the efficiency of direct memory access for the aforementioned data transfers pursuant to reducing the idle time of the CPU. It has been shown that this efficiency improvement is achieved through the inclusion of two small FIFO memory devices in the preferred embodiment that serve to reduce the system's bus latency.

It has further been shown that the aforementioned FIFO memory devices are utilized in such a way that more concurrent processing of request packets may be provided, when physical requests are present.

It has been shown that the aforementioned concurrent processing of request packets is provided as follows. When a physical read is present, the entire small read request packet can be moved immediately from the RF into the PRF by the request processing section of the PRD. This exposes any next request packet in the RF to another request processor, such as the RD or PWD. The response processing section of the PRD then fabricates the large response packet containing the response data into the ATF from the HI. Any target response retries are then shielded from the request processing section of the PRD which is now free to process more requests until the PRF is full of small request packets. Again, the request and response handling sections of the PRD are able to operate independently of each other, shielded, as it were, by the PRF.

When a physical write is present, the large request packet which includes the write data is written immediately to the HI by the request processing section of the PWD. This exposes any next request packet in the RF to other request processors, such as the RD or PRD. The request processing section of the PWD then fabricates enough information to convey to the response processing section of the PWD the entire response packet and loads this single quadlet into the PWF. The response processing section of the PWD then fabricates the small response from the information conveyed in the PWF and loads it into the ATF. Any target response retries are then shielded from the request processing section of the PWD which is now free to process more requests until the PWF is full of small response conveyances. Again, the request and response handling sections of the PWD are able to operate independently of each other, shielded, as it were, by the PWF.

Thus it has been shown that inclusion of the aforementioned FIFO memory devices in the OHCI and the way in which they are utilized provide the OHCI the capability to perform concurrent processing of host system and peripheral device data transfer requests. This concurrent processing serves to further reduce the system's bus latency by allowing the OHCI to simultaneously process multiple data transfers between the host system and peripherals.

Although the present invention and its advantages have been described in detail, it should be understood that various changes, substitutions and alterations can be made herein without departing from the spirit and scope of the invention as defined by the appended claims.

What is claimed is:

1. An IEEE 1394 serial bus controller adapted to process requests from a host central processing unit (CPU) in a host system having a system memory bus controllable, alternatively, by the CPU and by the bus controller, the bus controller, in response to the requests from the CPU, being capable of writing data from a peripheral device to a host system memory and being capable of reading data from the host system memory for transfer to the peripheral device, the bus controller having improved bus performance when a physical read request or a physical write request is present, comprising:

a link and physical layer interface (LPI) unit coupled to an IEEE 1394 serial bus having at least one peripheral device coupled thereto;

a host interface coupled to a host data bus;

a request FIFO (RF) unit coupled to receive host memory read and write request packets from said peripheral device through said LPI unit, and coupled to said host interface;

a physical response unit for receiving read and write requests from the CPU through said host interface;

an asynchronous FIFO for transmitting said read and write requests from said physical response unit to the peripheral device through said LPI unit;

a physical read FIFO (PRF) unit coupled to receive a physical read request from said RF unit for further processing of said physical read request;

a physical read direct memory access (PRD) unit responsive to a physical read request in said PRF unit for issuing a DMA request to said host system through said host interface to cause the CPU to relinquish control of the system memory bus, to transfer read data from the host data bus to said asynchronous FIFO for transfer to the peripheral unit and, after said read data is transferred, for returning control of the system memory bus to the CPU, signaling to the peripheral unit that the requested read is complete and, independently of said returning control of the system memory bus to the CPU, waiting for an acknowledgement from the peripheral device of said read completion signal;

a physical write DMA (PWD) unit responsive to a physical write request in said RF unit, said physical write request including write data to be written to the host system memory, for issuing a DMA request to said host system through said host interface to cause the CPU to relinquish control of the system memory bus, to transfer data to the host data bus and, after said write data is transferred, for returning control of the system memory bus to the CPU, signaling to the peripheral unit that the requested write is complete and, independently of said returning control of the system memory bus to the CPU, for waiting for an acknowledgement from the peripheral device of said write completion signal.

* * * * *